(12) United States Patent
Kim et al.

(10) Patent No.: US 10,047,470 B2
(45) Date of Patent: Aug. 14, 2018

(54) METHOD OF CONTROLLING WASHING MACHINE (71) Applicant: LG ELECTRONICS INC., Seoul (KR)

(72) Inventors: Kyunghoon Kim, Seoul (KR); Younghan Cho, Seoul (KR); Moonsuk Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 121 days.

(21) Appl. No.: 15/011,296

(22) Filed: Jan. 29, 2016

(65) Prior Publication Data
US 2016/0222569 A1 Aug. 4, 2016

(30) Foreign Application Priority Data

Feb. 2, 2015 (KR) .......................... 10-2015-0016105

(51) Int. Cl.
D06F 33/02 (2006.01)
D06F 37/20 (2006.01)
(Continued)

(52) U.S. Cl.
CPC ............ *D06F 37/203* (2013.01); *D06F 29/02* (2013.01); *D06F 33/02* (2013.01); *D06F 37/12* (2013.01);
(Continued)

(58) Field of Classification Search
CPC ........ D06F 33/02; D06F 35/005; D06F 37/12; D06F 37/203; D06F 39/003; D06F 39/088; D06F 2204/065
See application file for complete search history.

(56) References Cited

U.S. PATENT DOCUMENTS 5,293,760 A * 3/1994 Tani ...................... D06F 39/003
68/12.02
6,065,170 A * 5/2000 Jang ...................... D06F 37/203
68/12.04
(Continued)

FOREIGN PATENT DOCUMENTS

CN 1316564 10/2001
CN 101838914 9/2010
(Continued)

OTHER PUBLICATIONS

European Search Report dated Jun. 23, 2016 issued in Application No. 16153331.0.
(Continued)

Primary Examiner — Joseph L. Perrin
(74) Attorney, Agent, or Firm — KED & Associates LLP (57) ABSTRACT Disclosed is a method of controlling a washing machine including detecting an amount of clothes contained in a drum, supplying washing water based on the detected amount of clothes, washing the clothes by applying current to a drive module after the supply of the washing water, a rinsing operation of rinsing the clothes by supplying water to a tub from an external water source, after the washing of the clothes, determining unbalance of the clothes by applying current to the drive module while washing water is contained in the tub, after the rinsing of the clothes, dispersing the clothes by controlling the current applied to the drive module when the unbalance of the clothes is determined to be equal to or higher than a set value, discharging the washing water contained in the tub when the unbalance of the clothes is determined to be lower than the set value, and dehydrating the clothes to remove the washing water from the clothes, after the discharge of the washing water.

9 Claims, 7 Drawing Sheets (51) Int. Cl.
   *D06F 39/00*    (2006.01)
   *D06F 39/08*    (2006.01)
   *D06F 37/12*    (2006.01)
   *D06F 29/02*    (2006.01)

(52) U.S. Cl.
   CPC .......... *D06F 39/003* (2013.01); *D06F 39/088* (2013.01); *D06F 2204/065* (2013.01); *Y02B 40/56* (2013.01)

(56) References Cited

U.S. PATENT DOCUMENTS

| | | |
|---|---|---|
| 2008/0196172 A1 | 8/2008 | Jeong |
| 2010/0088829 A1* | 4/2010 | Park ............... D06F 37/245 8/159 |
| 2011/0146002 A1 | 6/2011 | Kim et al. |
| 2011/0247146 A1* | 10/2011 | Miller ............... D06F 35/007 8/137 |

FOREIGN PATENT DOCUMENTS

| | | |
|---|---|---|
| CN | 102762789 | 10/2012 |
| EP | 0 972 874 | 1/2000 |
| KR | 10-2005-0012524 | 2/2005 |
| KR | 10-2006-0089070 | 8/2006 |
| KR | 10-2007-0059418 | 6/2007 |
| KR | 10-2011-0014433 | 2/2011 |
| KR | 10-2013-0005041 | 1/2013 |
| KR | 10-2013-0015207 | 2/2013 |

OTHER PUBLICATIONS

Korean Notice of Allowance dated Jul. 22, 2016 issued in Application No. 10-2015-0016105.
Chinese Office Action dated Jul. 31, 2017 issued in Application No. 201610073558.1 (English translation attached).

* cited by examiner

METHOD OF CONTROLLING WASHING MACHINE

CROSS-REFERENCE TO RELATED APPLICATION

This application claims the priority benefit of Korean Patent Application No. 10-2015-0016105, filed on Feb. 2, 2015, in the Korean Intellectual Property Office, the disclosure of which is incorporated herein by reference in its entirety.

BACKGROUND

1. Field

The present invention relates to a method of controlling a washing machine.

2. Background

In general, a washing machine is an appliance that washes laundry using the surfactant action of detergent, a water stream generated via rotation of a washing tub or a washing blade, shocks applied by the washing blade, and the like. The washing machine performs washing, rinsing or dehydration processes to remove contaminants adhering to laundry (hereinafter referred to as 'clothes') using the interaction of water and detergent.

Washing machines are classified into an agitator-type washing machine, a pulsator-type washing machine, and a drum-type washing machine.

The agitator-type washing machine rotates a washing rod, which protrudes from the center of a washing container, clockwise and counterclockwise so as to wash laundry. The pulsator type washing machine rotates a disk rotary blade, which is formed at the lower portion of a washing container, clockwise and counterclockwise directions so as to wash laundry using the frictional force between a water stream and the laundry. The drum-type washing machine rotates a drum accommodating water, detergent, and laundry therein so as to wash laundry.

When a dehydration operation is performed in a typical pulsator-type washing machine, the washing water in the tub is completely discharged.

In the dehydration operation, the unbalance of clothes is checked for by rotating a drum.

When the unbalance is detected, washing water is supplied to the tub again, and an operation of dispersing the clothes is performed.

After the dispersion of the clothes, the washing water in the tub is completely discharged again, and the unbalance is checked for again.

Accordingly, when the unbalance of a drum occurs, a method of controlling such a conventional top-loading washing machine has to repeatedly perform the resupply of washing water and dispersion of clothes, thereby causing a problem whereby the washing time is increased.

Furthermore, since the method of controlling the conventional top-loading washing machine has to supply washing water again in order to perform the dispersion of clothes, there is a problem whereby the amount of used water is increased.

RELATED ART DOCUMENT

Patent Document

Korean Unexamined Patent Publication No. 10-2013-0015207.

BRIEF DESCRIPTION OF THE DRAWINGS

Embodiments will be described in detail with reference to the following drawings in which like reference numerals refer to like elements, and wherein.

DETAILED DESCRIPTION

The advantages and features of the present invention and the way of attaining them will become apparent with reference to embodiments described below in detail in conjunction with the accompanying drawings. Embodiments, however, may be embodied in many different forms and should not be constructed as being limited to example embodiments set forth herein. Rather, these example embodiments are provided so that this disclosure will be through and complete and will fully convey the scope to those skilled in the art. The scope of the present invention should be defined by the claims. Wherever possible, the same reference numbers will be used throughout the drawings to refer to the same or like parts.

Figure 1:
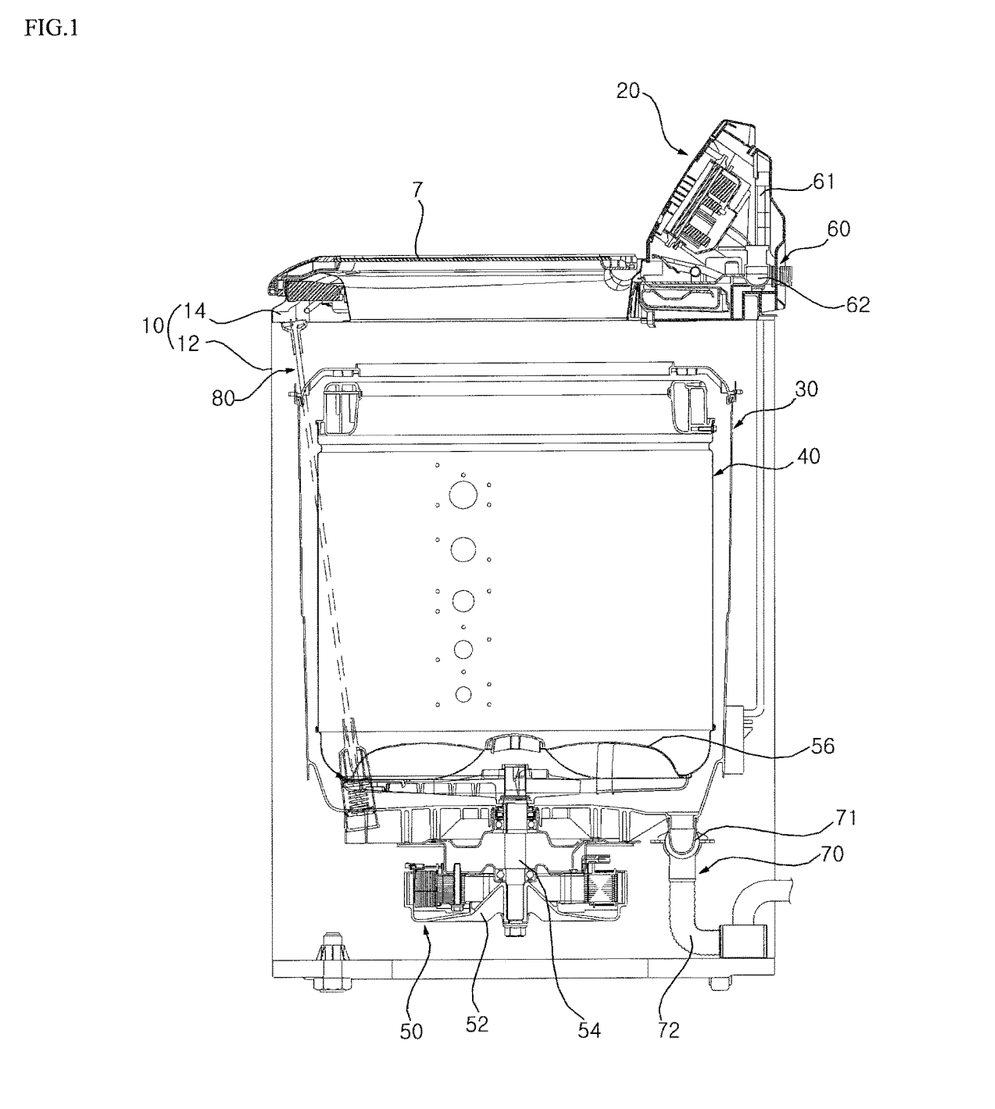
FIG. 1 is a cross-sectional view showing the interior of a washing machine according to a first embodiment of the present invention.

FIG. 1 is a cross-sectional view showing the interior of a washing machine according to a first embodiment of the present invention.

The washing machine according to the embodiment includes a casing 10 defining the appearance of the washing machine, a control module 20, which is mounted on the casing 10 and includes operation keys to which manipulating force is transferred, a display for displaying information relating to operating conditions of the washing machine, and the like, a tub 30, which is disposed in the casing 10 so as to contain therein washing water, a drum 40, which is disposed in the tub 30 so as to contain laundry, a drive module 50, which is disposed at the tub 30 and rotates the drum 40 so as to wash laundry, a water supply module 60 for supplying washing water to the drum 40, a water discharge module 70 for discharging washing water contained in the drum 40, and a suspension module 80 for reducing or absorbing vibrations generated by the tub 30.

The casing 10 includes a body 12 which accommodates the tub 30 and the drum 40, a top cover 14 disposed on the body 12, and a door 7, which is disposed on the top cover 14 so as to open and close the interior of the casing 10.

The control module 20 includes manual operation buttons, dials and the like, which serve as an input part 21, and a display unit (not shown) serving as a display part 22 for transmitting various information about the washing machine to a user. In this embodiment, the control module 20 is disposed on the top cover 14.

The tub 30 stores washing water supplied from the water supply module 60. The tub 30 is connected to the water discharge module 70 so as to discharge water contained therein to the outside.

The drum 40 is disposed in the tub 30, and is constructed to be rotated in the forward or reverse direction with respect to the tub 30.

In this embodiment, the drive module 50 includes a motor 52 disposed under the tub 30, a drive shaft 54, which extends through the tub 30 and is connected to the drum 40, and a pulsator 56, which is disposed in the drum 40 and is selectively rotated by drive force transmitted from the motor 52.

In this embodiment, the pulsator 56 may be disposed in the drum 40, and may be rotated in the forward or reverse direction, independent of the rotation of the drum 40.

In this embodiment, the water supply module 60 includes a water supply valve 61 and a water supply channel 62, which are disposed on the top cover 12.

In this embodiment, the water discharge module 70 includes a water discharge valve 71, connected to the tub 30, and a water discharge channel 72, connected to the water discharge valve 71.

The suspension module 80 is connected to the tub 30 so as to reduce vibrations, generated by the tub 30, using at least one of elastic force and damping force.

Figure 2:
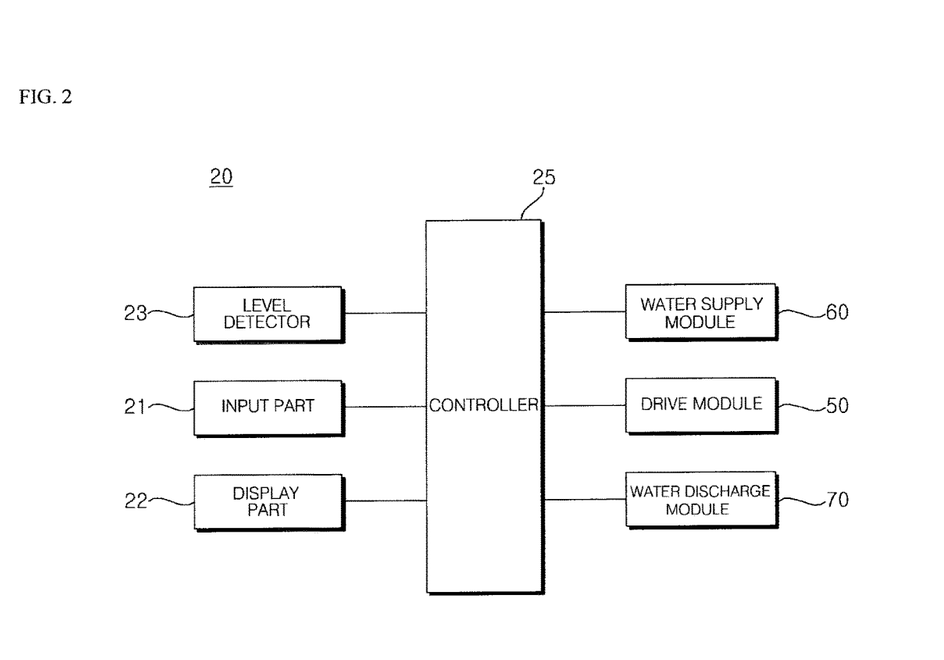
FIG. 2 is a block diagram of a top-loading washing machine according to an embodiment of the present invention.

FIG. 2 is a block diagram of a top-loading washing machine according to an embodiment of the present invention.

A controller 25 controls the overall operation of the washing machine in response to the operation command input to the input part 21.

The controller 25 is preferably provided in the control module 20.

The controller 25 may be constituted by a microcomputer for controlling the operation of the washing machine, a storage device, and other electronic devices.

The controller 25 determines whether each process proceeds, or whether operations, such as water supply, washing, rinsing, drainage, and dehydration, are performed in each process, the operation time, and the number of repetitions, according to the washing course selected by the user, so as to operate the washing machine.

The controller 25 receives the wash water level, measured by the water level sensor 123, and processes the same.

The controller 25 receives the rotational speed of the drum 40, measured by the drive module 50, and processes the same.

The controller 25 receives operation commands from the input part 21 and displays the operating conditions on the display part 22.

The controller 25 controls the water supply module 60, the drive module 50 and the water discharge module 70 in accordance with the selected course or other operation commands.

Figure 3:
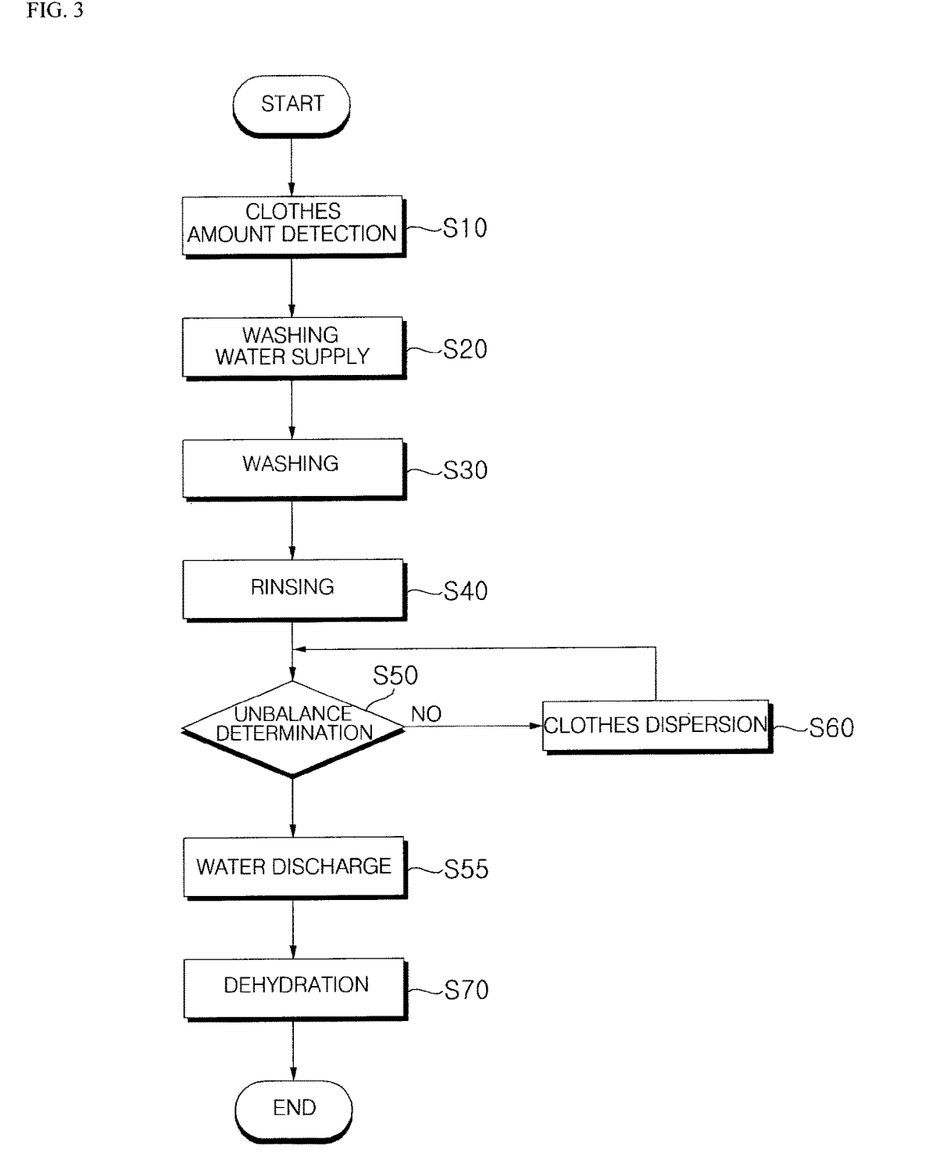
FIG. 3 is a flowchart illustrating the washing process of the washing machine according to one embodiment of the present invention.

FIG. 3 is a flowchart illustrating the washing process of the washing machine according to one embodiment of the present invention.

First of all, the washing machine according to the embodiment detects an amount of clothes (hereinafter, referred to as "clothes amount") contained in the drum 40.

In a clothes amount detection operation S10, power is applied to the drive module 50 so as to rotate the drum 40.

In the clothes amount detection operation S10, the amount of clothes may be measured in various ways.

The controller 25 may rotate the drum 40 at a predetermined rotational speed for a predetermined period of time by means of the drive module 50, and may determine a clothes amount by measuring a deceleration time.

Alternatively, the controller 25 may also determine a clothes amount by measuring the time taken by the drum 40 to be accelerated to a predetermined rotational speed by the drive module 50.

In this way, a clothes amount in the clothes amount detection operation S10 may be measured or determined in various ways.

The controller 25 further determines the operating times of respective operations based on the detected clothes amount.

Subsequently, a washing water supply operation S20 is performed in such a manner as to supply washing water to a target water level, which is determined based on the clothes amount determined in the clothes amount detection operation S10.

The target water level is a target amount of washing water, to be supplied into the tub 30 after completion of the washing water supply operation S20.

In the washing water supply operation S20, the controller 25 controls the water supply module 60 to supply washing water into the tub 30 until a water level reaches the target water level.

In the washing water supply operation S20, washing water supplied from an external water source, is mixed with detergent and is then supplied into the tub 30, and clothes are wetted with the washing water mixed with detergent. The washing water supply operation S20 is an operation of performing preliminary washing prior to a washing operation S30.

In the washing operation S30, the drum 40 and the pulsator 56 may be rotated at various rotational speeds. Furthermore, in the washing operation S30, the drum 40 and the pulsator 56 may be rotated in various directions.

After the washing operation S30, the washing water containing pollutants is discharged to the outside through the water discharge module 70.

A rinsing operation S40 is intended to rinse away detergent contained in clothes. In this operation, washing water is supplied from an external water source.

The drum 40 and the pulsator 56 may also be rotated in the rising operation S40. The rinsing operation S40 may be repeated several times.

The controller 25 performs an unbalance determining operation S50 in such a manner as to check for the unbalance of clothes in the state in which the washing water in the tub 30 is not discharged, or in which some of the washing water is left in the tub 30 after the completion of the rinsing operation S40.

The unbalance determining operation S50 is intended to accelerate the drum 40 in an unbalance-inducing pattern while washing water is contained in the tub 30. The unbalance determining operation S50 is an operation of checking for unbalance of the drum 40.

In conventional washing machines, an unbalanced state is determined while the drum 40 is rotated at a constant or increasing speed after the washing water in the tub 30 is completely discharged.

Unlike this, this embodiment determines unbalance in the state in which washing water is not discharged, or some of the washing water is left after completion of the rinsing operation S40.

In particular, this embodiment accelerates the drum 40 in an unbalance-inducting pattern, which is highly related to dehydration vibration. The unbalance determining operation S50 is performed in such a manner as to calculate variation in the speed of the drum in a specified acceleration range within which the drum 40 is accelerated in the unbalance-inducing pattern.

In other words, this embodiment accelerates the drum 40 in the unbalance-inducing pattern assuming that the clothes contained in the drum 40 are unbalanced. When variation in the speed of the drum 40, which is accelerated in the unbalance-inducing pattern, exceeds the reference value, it is determined that there is unbalance.

Meanwhile, when the variation in the speed of the drum 40, which is accelerated in the unbalance-inducing pattern, is lower than the reference value, it is determined that there is no unbalance.

When it is determined that the clothes contained in the drum 40 are unbalanced, a clothes dispersion operation S60 is performed.

Since washing water is not discharged after the rinsing operation S40, the unbalanced clothes are uniformly dispersed by rotating at least one of the pulsator 56 and the drum 40 without an additional water supply procedure, in the clothes dispersion operation S60.

The clothes dispersion operation S60 according to this embodiment is able to save washing water by obviating an additional water supply procedure for the dispersion of clothes. Furthermore, the clothes dispersion operation S60 according to this embodiment is also able to reduce washing time by virtue of omission of the water supply procedure. The clothes dispersion operation S60 may be repeatedly performed.

After the clothes are dispersed by the clothes dispersion operation S60, the washing water in the tub 30 is completely discharged, and then a dehydration operation S70 is performed.

Figure 4:
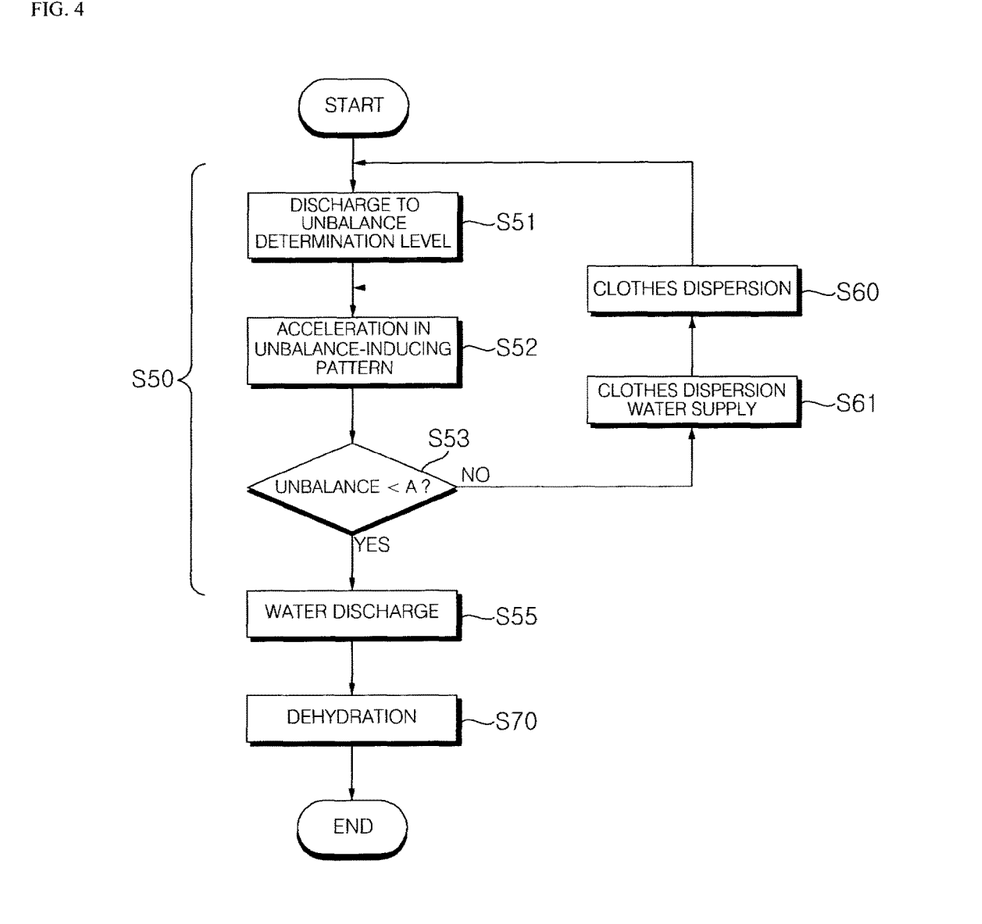
FIG. 4 is a flowchart showing a method of controlling a washing machine, according to an embodiment of the present invention.
Figure 5:
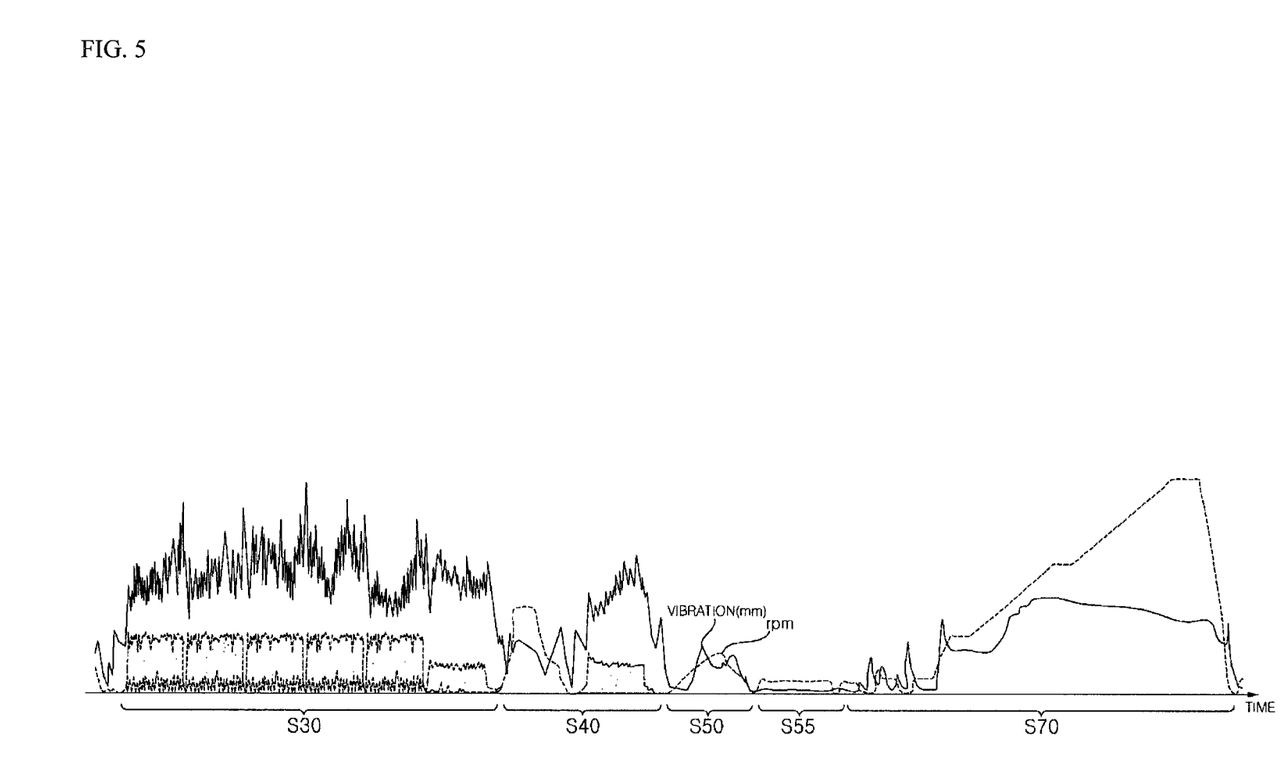
FIG. 5 is a first illustrative graph showing the method of controlling a washing machine according to the embodiment of the present invention.
Figure 6:
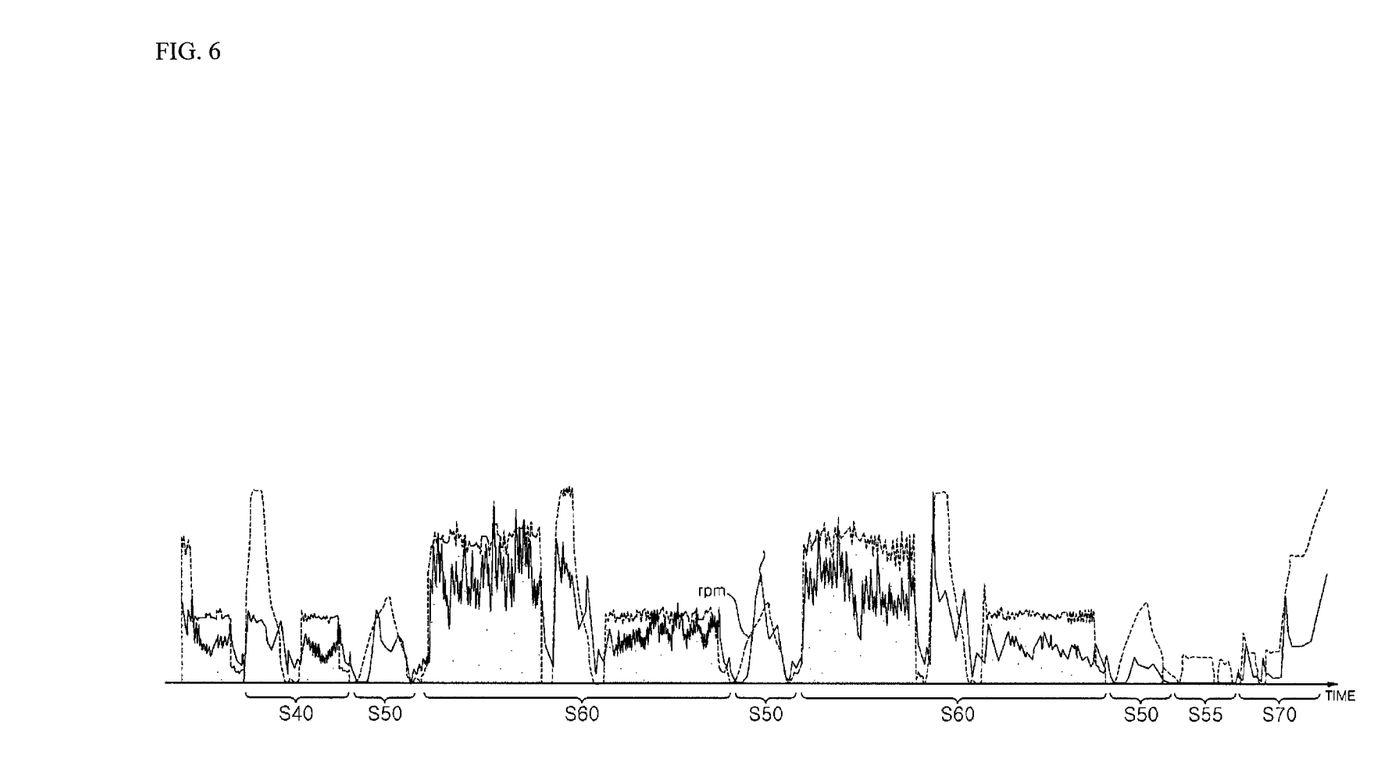
FIG. 6 is a second illustrative graph showing the method of controlling a washing machine according to the embodiment of the present invention.
Figure 7:
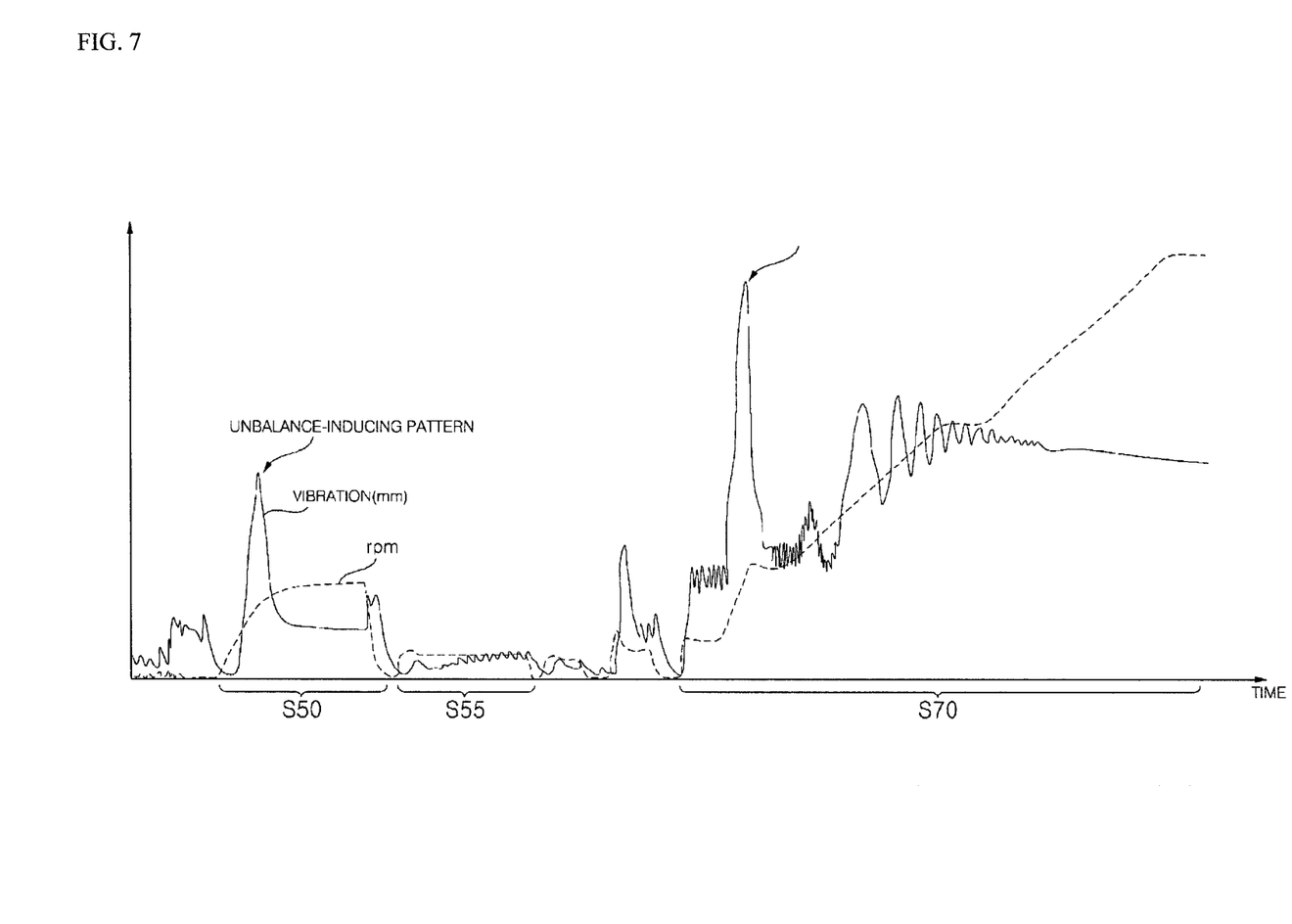
FIG. 7 is a graph showing the unbalance-inducing pattern shown in FIG. 4.

FIG. 4 is a flowchart showing a method of controlling a washing machine according to an embodiment of the present invention. FIG. 5 is a first illustrative graph showing the method of controlling a washing machine according to the embodiment of the present invention. FIG. 6 is a second illustrative graph showing the method of controlling a washing machine according to the embodiment of the present invention. FIG. 7 is a graph showing the unbalance-inducing pattern shown in FIG. 4.

The unbalance determining operation S50 includes, after the rinsing operation S40, an unbalance water discharge operation S51 of discharging the washing water in the tub 30 until the washing water reaches an unbalance determination level, an unbalance-inducing acceleration operation S52 of accelerating the drum 40 in the unbalance-inducing pattern by controlling the drive module 50 when the washing water is discharged to the unbalance determination level, and an unbalance comparison operation S53 of, after the unbalance-inducing acceleration operation S52, detecting unbalance and comparing the detected unbalance with a set value A.

As a result of the comparison, when the detected unbalance is lower than the set value A, it is determined that dehydration is possible, and a water discharge operation S55 is performed so as to completely discharge the washing water contained in the tub 30.

The graph shown in FIG. 5 is created when the clothes dispersion operation S60 is not performed, and the graph shown in FIG. 6 is created when the clothes dispersion operation S61 is performed.

The unbalance water discharge operation S51 is an operation of lowering the water level in the tub 30 to an appropriate level, and may be obviated depending on the water level in the rinsing operation S40.

For example, when the final water level in the rinsing operation S40 satisfies the unbalance determination level, the unbalance water discharge operation S51 is obviated.

Meanwhile, when the water level after the rinsing operation S40 is higher than the unbalance determination level, it is possible to discharge washing water until the water level reaches the unbalance determination level.

In this embodiment, the unbalance determination level is the level at which at least a portion of the pulsator 56 is immersed in washing water. In this case, some of the clothes may not be immersed in the washing water.

As the unbalance determination level in this embodiment is lowered, there is an effect of increasing vibration, thereby making it possible to clearly detect a speed variation, which will be described later.

In the unbalance-inducing acceleration operation S52, current is applied to the drive module 50, and the drum 40 is accelerated under conditions similar to those in which washing water is discharged.

The controller 25 accelerates the drum 40 in a pattern that is highly related to dehydration vibrations or washing vibrations, calculates a speed variation within the acceleration range, and defines the calculated value as the unbalance.

Unlike this embodiment, the unbalance may be defined in various manners. Since the unbalance-related technology is a technology which is well known to those skilled in the art, a detailed description thereof is omitted.

In the unbalance comparison operation S53, the detected speed variation (unbalance) and the set value A are compared with each other.

Specifically, the controller 25 applies the target speed to the drive module 50 and detects an actual speed variation.

Here, the speed variation signifies variations, and the magnitude of speed variation and the magnitude of variations are in direct proportion to each other.

When the magnitude of speed variation is equal to or higher than the set value A, it is determined that the unbalance is high, and the clothes dispersion operation S60 is thus performed. When the magnitude of speed variation is lower than the set value A, it is determined that dehydration is possible.

As a result of the unbalance comparison operation S53, when it is determined that dehydration is possible, an additional water supply or clothes dispersion is omitted, and all of the washing water in the tub 30 is completely discharged.

The procedure of proceeding to the dehydration operation S70 without the clothes dispersion operation S60 is illustrated in FIG. 5. In the graph, the solid line indicates a vibration value, and the dotted line indicates an rpm value.

Meanwhile, when it is determined that there is unbalance in the unbalance comparison operation S53, the clothes dispersion operation S60 is performed.

Since the tub 30 is filled with washing water to the unbalance determination level even after the unbalance comparison operation S53, the controller 25 may also directly perform the clothes dispersion operation S60 without resupplying washing water.

In this embodiment, since the unbalance determination level is lower than a washing level, washing water is resupplied up to the clothes dispersion level (S61).

However, since the tub 30 is filled with washing water to the unbalance determination level, the amount of washing water that is resupplied is smaller than that in a conventional example.

Although the clothes dispersing level may be the same as the water level in the washing operation S30, the clothes dispersing level in this embodiment is controlled to be lower than the water level in the washing operation S30.

The clothes dispersion operation S60 may be performed in various manners.

For example, for the purpose of execution of the clothes dispersion operation S60, the controller 25 may drive at least one of the pulsator 56 and the drum 40 so as to agitate clothes.

Furthermore, for the purpose of execution of the clothes dispersing operation S60, the controller 25 may rotate the drum 40 so as to create an alpha water stream.

The alpha water stream refers to a water stream which falls down from an upper portion to a lower portion of the drum 30, like a waterfall, after washing water is outwardly impelled toward the inner circumferential surface of the tub 30 due to the centrifugal force of the drum 40.

The alpha water stream offers an effect of agitating clothes in the drum 40, whereby the clothes dispersion operation S60 is implemented.

After the clothes dispersion operation S60, the operation is returned to the unbalance water discharge operation S51 where the unbalance determination operation S50 is performed again.

The unbalance determination operation S50 may be repeatedly performed.

The procedure of performing the clothes dispersion operation S60 in this way is illustrated in FIG. 6.

In the graph, the solid line indicates a vibration value which is input to the drive module 50, and the dotted line indicates an rpm value of the drum 30. From the graph, it is noted that the clothes dispersion operation S60 is performed twice.

Furthermore, it is noted that the unbalance determination operation S50 is performed three times and the vibration value is decreased in the third unbalance determination operation S50 after the execution of the clothes dispersion operation S60.

The vibration value signifies the speed variation in the unbalance comparison operation S53.

As described above, since this embodiment determines the unbalance in the state in which the tub 30 is filled with washing water prior to proceeding to the dehydration operation S70 or the water discharge operation S55, there is an effect of minimizing the amount of washing water used in the clothes dispersion water supply operation S61.

Furthermore, since the amount of washing water used in the clothes dispersion water supply operation S61 is minimized, it is also possible to reduce the water supply time.

Referring to FIG. 7, the unbalance-inducing pattern causes the drum 40 to be accelerated in strong correlation with unbalance generated in the dehydration operation S70.

In the dehydration operation S70, the unbalance detection and the clothes dispersion may be performed independently of the unbalance determination operation S50 and the clothes dispersion operation S60.

As is apparent from the above description, the washing machine and the method of controlling the same according to the present invention have one or more effects described below.

First, since the unbalance of clothes is determined and a clothes dispersion operation is performed while clothes are immersed in washing water, the present invention offers an advantage of being capable of directly performing clothes dispersion without the resupply of washing water, or with minimal resupply of washing water.

Secondly, since unbalance of clothes is determined and a clothes dispersion operation is performed while clothes are immersed in washing water, the present invention offers an advantage of being capable of minimizing the resupply of washing water for clothes dispersion so as to minimize the amount of washing water that is used and the resupply time.

Thirdly, the present invention offers an advantage of being capable of accelerating a tub in a pattern in strong correlation with dehydration vibrations generated in a dehydration operation so as to create an unbalance-inducing pattern while clothes are immersed in washing water, thereby enabling determination of the unbalance.

Fourthly, since unbalance is determined while clothes are immersed in washing water, and dehydration is performed when there is no unbalance, the present invention offers an advantage of being capable of minimizing dehydration time.

The present invention is not limited to the foregoing effects, and other effects thereof will be clearly understood by those skilled in the art from the following claims.

Therefore, the present invention has been made in view of the above problems, and it is an object of the present invention to provide a method of controlling a washing machine, which minimizes the amount of washing water used in clothes dispersion during dehydration.

Another object of the present invention is to provide a method of controlling a washing machine, which minimizes the amount of water used for washing by checking for the unbalance of clothes before discharge of the washing water.

A further object of the present invention is to provide a method of controlling a washing machine, which minimizes the time taken to disperse clothes by checking for the unbalance of clothes before discharging washing water.

The present invention is not limited to the foregoing objects, and the other objects thereof will be clearly understood by those skilled in the art from the following description.

In accordance with an aspect of the present invention, there is provided a method of controlling a washing machine including a clothes amount detection operation of detecting an amount of clothes contained in a drum, a washing water supply operation of supplying washing water based on the detected amount of clothes, a washing operation of washing the clothes by applying current to a drive module after the washing water supply operation, a rinsing operation of rinsing the clothes by supplying water to a tub from an external water source, after the washing operation, an unbalance determination operation of determining unbalance of the clothes by applying current to the drive module while washing water is contained in the tub, after the rinsing operation, a clothes dispersion operation of dispersing the clothes by controlling the current applied to the drive module when the unbalance of the clothes is determined to be equal to or higher than a set value, a water discharge operation of discharging the washing water contained in the tub when the unbalance of the clothes is determined to be lower than the set value, and a dehydration operation of dehydrating the clothes to remove the washing water from the clothes, after the water discharge operation.

The method may further include an unbalance water discharge operation of discharging the washing water contained in the tub such that the level of the washing water reaches an unbalance determination level, between the rinsing operation and the unbalance water discharge operation.

The drum may be provided therein with a pulsator, which is rotated by the drive module, wherein the unbalance determination level may be defined as a level at which at least a portion of the pulsator is immersed in the washing water.

A controller may apply current corresponding to a target speed to the drive module and may detect the actual speed variation of the drum, wherein the unbalance determination operation compares the speed variation with the set value.

The method may further include a clothes dispersion water supply operation of supplying washing water into the tub so as to disperse the clothes, between the unbalance determination operation and the clothes dispersion operation.

The method may further include, after the clothes dispersion operation, an unbalance water discharge operation of discharging the washing water, supplied in the clothes dispersion water supply operation, such that a level of the washing water reaches an unbalance determination level.

The unbalance determination operation may include an unbalance water discharge operation of discharging the washing water in the tub after the rinsing operation such that a level of the washing water reaches an unbalance determination level, an unbalance-inducing acceleration operation of accelerating the drum in an unbalance-inducing pattern, which is conductive to creation of unbalance, by controlling a current value of the drive module after the unbalance water discharge operation, and an unbalance comparison operation of detecting unbalance and comparing the detected unbalance with the set value, after the unbalance-inducing acceleration operation.

A controller may apply current corresponding to a target speed to the drive module, and may detect the actual speed variation of the drum, and the unbalance comparison operation may compare the speed variation with the set value.

The method may further include a clothes dispersion water supply operation of supplying washing water into the tub so as to disperse the clothes, between the clothes dispersion operation and the unbalance comparison operation.

After the clothes dispersion operation, the controlling process may return to the unbalance water discharge operation.

When the speed variation is lower than the set value in the unbalance comparison operation, the controlling process may proceed to the water discharge operation.

After the clothes dispersion operation, the controlling process may return to the unbalance determination operation.

The method may further include a clothes dispersion water supply operation of supplying washing water into the tub between the unbalance determination operation and the clothes dispersion operation.

The method may further include, after the clothes dispersion operation, an unbalance water discharge operation of discharging the washing water, which is supplied in the clothes dispersion water supply operation, such that the washing water reaches an unbalance determination level.

In accordance with another aspect of the present invention, there is provided a method of controlling a washing machine including an unbalance water discharge operation of discharging washing water contained in a tub such that a level of the washing water reaches an unbalance determination level, after a rinsing operation, an unbalance-inducting acceleration operation of accelerating a drum in an unbalance-inducing pattern, which is conducive to creation of unbalance, by controlling a current value of a drive module, after the unbalance water discharge operation, and an unbalance comparison operation of detecting unbalance and comparing the detected unbalance with a set value, after the unbalance-inducing acceleration operation.

The drum may be provided therein with a pulsator, which is rotated by the drive module, wherein the unbalance determination level may be defined as a level at which at least a portion of the pulsator is immersed in the washing water.

A controller may apply current corresponding to a target speed to the drive module and may detect the actual speed variation of the drum, and the unbalance determination operation may compare the speed variation with the set value.

The method may further include a clothes dispersion operation of dispersing clothes in the drum by controlling current supplied to the drive module when the speed variation is equal to or higher than the set value, wherein, after the clothes dispersion operation, the controlling process is returned to the unbalance water discharge operation.

The method may further include a clothes dispersion water supply operation of supplying washing water into the tub between the clothes dispersion operation and the unbalance comparison operation.

The method may further include, when the speed variation is lower than the set value, a water discharge operation of discharging washing water in the tub, and a dehydration operation of dehydrating clothes so as to remove washing water from clothes after the water discharge operation.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a washing machine having a tub and a drum, the method comprising:
   detecting an amount of clothes in the drum;
   supplying washing water based on the detected amount of clothes;

after supplying the washing water, washing the clothes by applying current to a drive module;

after washing the clothes, rinsing the clothes by supplying water to the tub from an external water source;

after rinsing the clothes, determining unbalance of the clothes by applying current to the drive module while washing water is in the tub;

when the unbalance of the clothes is determined to be equal to or greater than a predetermined value, supplying washing water to the tub and dispersing the clothes by controlling the current applied to the drive module;

when the unbalance of the clothes is determined to be less than the predetermined value, discharging the washing water in the tub; and after discharging the washing water, dehydrating the clothes to remove the washing water from the clothes, wherein determining the unbalance of the clothes includes:

after rinsing the clothes, discharging the washing water in the tub s until a level of the washing water in the tub is determined to reach an unbalance determination level, and then stopping the discharging of the washing water when the level of the washing water is determined to reach the unbalance determination level;

after discharging the washing water in the tub until the level of the washing water in the tub is determined to reach the unbalance determination level, accelerating the drum in an unbalance-inducing pattern to create an unbalance by controlling the current of the drive module; and after accelerating the drum in the unbalance-inducing pattern, detecting the unbalance and comparing the detected unbalance with the predetermined value, wherein a pulsator is provided in the drum, and the pulsator is rotated by the drive module, wherein the unbalance determination level is a level at which at least a portion of the pulsator is immersed in the washing water, wherein the unbalance-inducing pattern accelerating the tub in a pattern is in strong correlation with dehydration vibrations generated in a dehydration operation in order to intentionally create unbalance in the drum, comprising applying, by a controller, current corresponding to a target speed to the drive module, and detecting an actual speed variation of the drum, and wherein determining the unbalance of the clothes includes comparing the actual speed variation of the drum with the predetermined value.

2. The method according to claim 1, wherein after dispersing the clothes, the method comprising discharging the washing water such that a level of the washing water reaches the unbalance determination level.

3. The method according to claim 1, wherein after supplying washing water to disperse the clothes, the method returns to discharging the washing water such that the washing water reaches the unbalance determination level.

4. The method according to claim 1, wherein when the speed variation is less than the predetermined value, the method proceeds to discharge the washing water in the tub.

5. The method according to claim 1, wherein after dispersing the clothes, the method returns to the determining of the unbalance of the clothes.

6. The method according to claim 5, further comprising after dispersing the clothes, discharging the washing water such that the washing water reaches the unbalance determination level.

7. A method of controlling a washing machine having a tub and a drum, the method comprising:

performing a rinsing operation;

discharging washing water in the tub until a level of the washing water in the tub is determined to reach an unbalance determination level, and then stopping the discharging of the washing water when the level of the washing water is determined to reach the unbalance determination level;

after discharging the washing water until the level of the washing water in the tub is determined to reach the unbalance determination level, accelerating a drum in an unbalance-inducing pattern, to create an unbalance, by controlling a drive module; and after accelerating the drum, detecting unbalance and comparing the detected unbalance with a predetermined value, wherein a pulsator is provided in the drum, and the pulsator is rotated by the drive module, wherein the unbalance determination level is a level at which at least a portion of the pulsator is immersed in the washing water, wherein the unbalance-inducing pattern accelerating the tub in a pattern is in strong correlation with dehydration vibrations generated in a dehydration operation in order to intentionally create unbalance in the drum, comprising applying, by a controller, current corresponding to a target speed to the drive module, and detecting an actual speed variation of the drum, and wherein the detecting of the unbalance and the comparing includes comparing the actual speed variation with the predetermined value, wherein when the speed variation is equal to or greater than the predetermined value, the method comprising supplying washing water to the tub and dispersing clothes in the drum by controlling the drive module.

8. The method according to claim 7, wherein after dispersing the clothes, the method returns to the discharging of the washing water.

9. The method according to claim 7, wherein when the speed variation is less than the predetermined value, the method comprising discharging washing water in the tub; and after discharging the washing water, dehydrating clothes to remove washing water from the clothes.

* * * * *